United States Patent [19]
Dence

[11] 3,749,206
[45] July 31, 1973

[54] SELF-ENERGIZED DISC BRAKE MECHANISM
[75] Inventor: Donald Spencer Dence, Brooklyn, Mich.
[73] Assignee: Clark Equipment Company, Buchanan, Mich.
[22] Filed: Dec. 9, 1971
[21] Appl. No.: 206,315

[52] U.S. Cl. .............................. 188/72.2, 188/72.9
[51] Int. Cl. ........................................... F16d 55/46
[58] Field of Search ......................... 188/72.2, 72.9

[56] References Cited
UNITED STATES PATENTS
1,900,282  3/1933  Halbach ........................ 188/72.9 X
3,207,267  9/1965  Beuchle et al. ................... 188/72.2
3,592,300  7/1971  Thomas ........................... 188/72.2

Primary Examiner—George E. A. Halvosa
Attorney—Kenneth C. Witt et al.

[57] ABSTRACT

A brake mechanism which is self-energizing and adapted to brake a rotatable disc is disclosed. The mechanism includes a pair of pressure members which may be moved toward one another into frictional engagement with the rotatable disc disposed therebetween and a linkage connecting the pressure members with a stationary frame. The linkage requires that a component of the braking force exerted by the pressure members in braking the rotation of the disc be utilized to urge the pressure members toward the disc and into greater frictional engagement with the disc.

3 Claims, 5 Drawing Figures

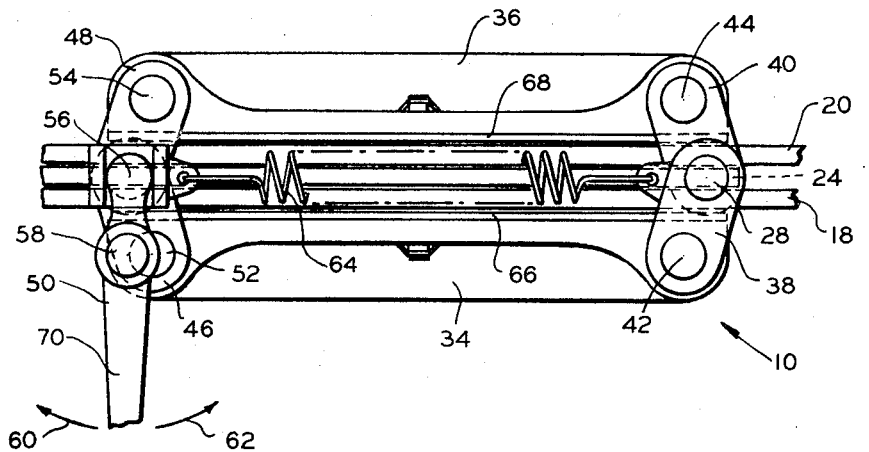
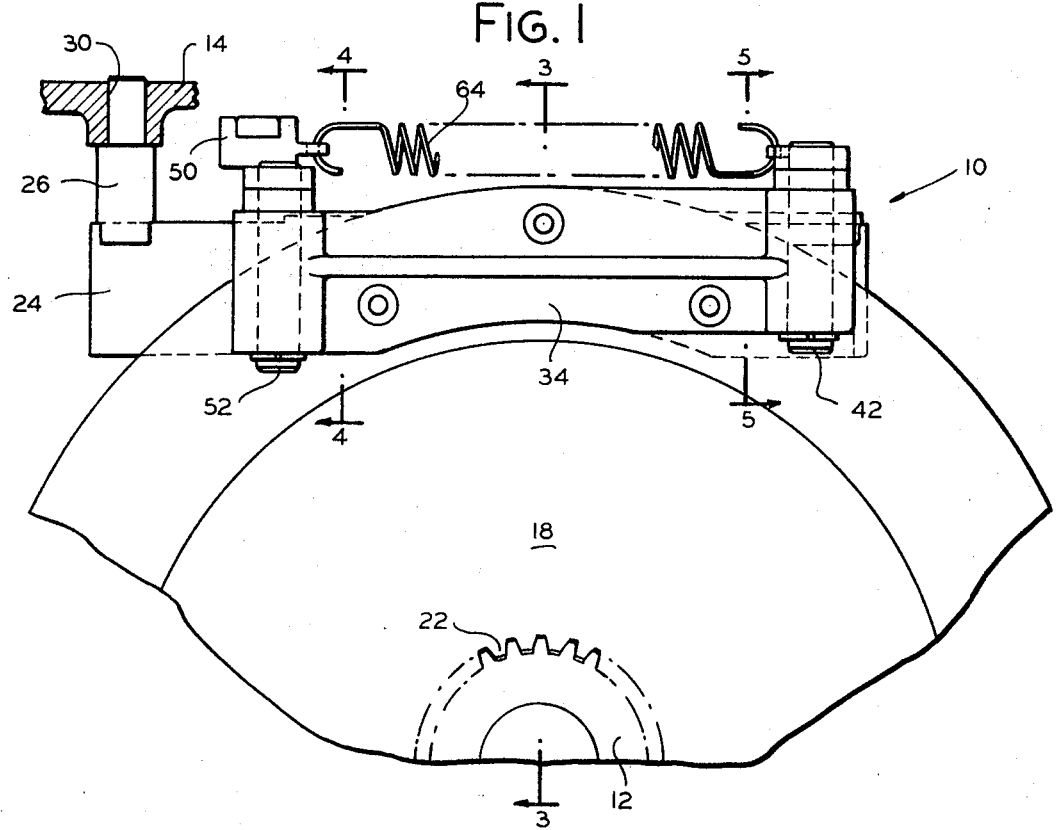

INVENTOR
DONALD S. DENCE
BY
Robert J. Horton
ATTORNEY

SELF-ENERGIZED DISC BRAKE MECHANISM

BACKGROUND OF THE INVENTION

The field of art to which this invention pretains includes brake mechanism, and more specifically those types of such mechanisms which are know as "disc" brakes.

Disc brakes, favored particularly for use on racing cars, have become popular for use on other types of vehicles as well since they offer improved braking performance. Heretofore, however, such disc brake mechanisms have not been "self-energizing" and consequently it is usually necessry to provide some form of power booster device to supply the higher hydraulic system pressures required to operate these mechanisms on heavier vehicles.

One object of my invention is to provide a disc barke mechanism which is self-energizing, but other objects, features, and advantages of my invention will be more readily understood by persons skilled in the art when the following detailed description is taken in conjunction with the drawing.

SUMMARY OF THE INVENTION

In carrying out my invention in one preferred embodiment thereof I provide a brake mechanism for use with a disc rotatable relative to a stationary frame. The mechanism includes a pressure member positioned adjacent the disc and a linkage connecting the pressure member to the frame. The linkage permits the pressure member to move tangent to the direction of rotation of the disc but requires that the pressure member also move toward the disc when it is moved tangent to the disc.

BRIEF DESKRIPTION OF THE DRAWING

FIG. 1 shows a side view of a brake mechanism according to this invention in operative relationship with a rotatable disc and shaft;

FIG. 2 is a partial top view of the brake mechanism shown in FIG. 1;

DESCRIPTION OF PREFERRED EMBODIMENT

Figure 3:
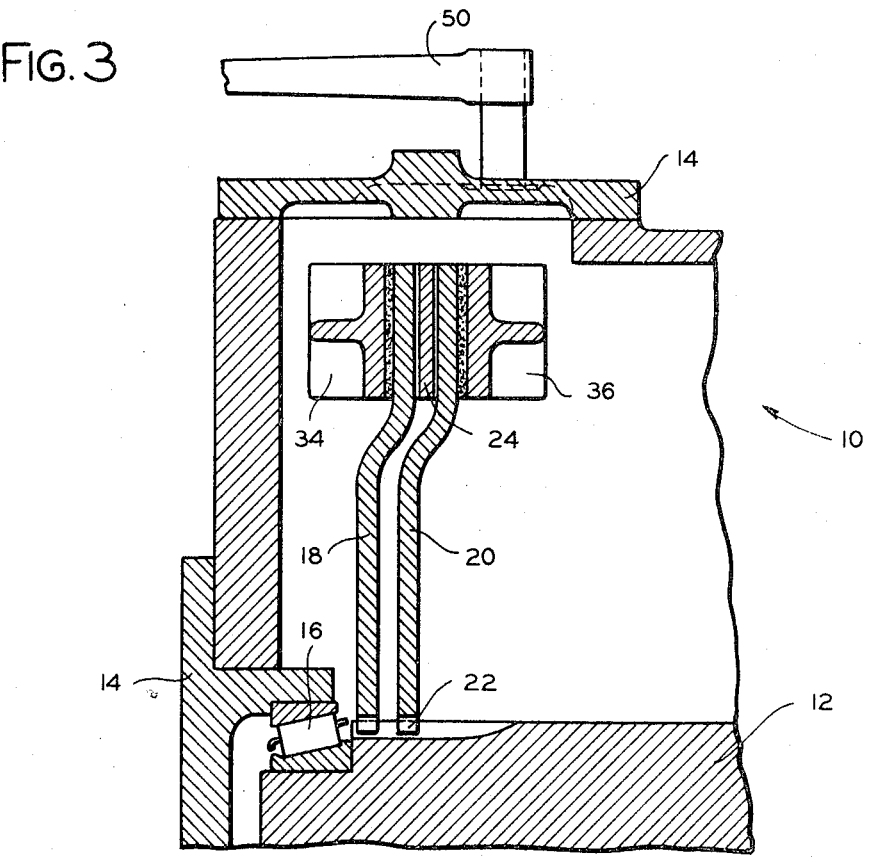
FIG. 3 is a partial sectional view of the mechanism shown in FIG. 1 along the line 3—3 thereof.
Figure 4:
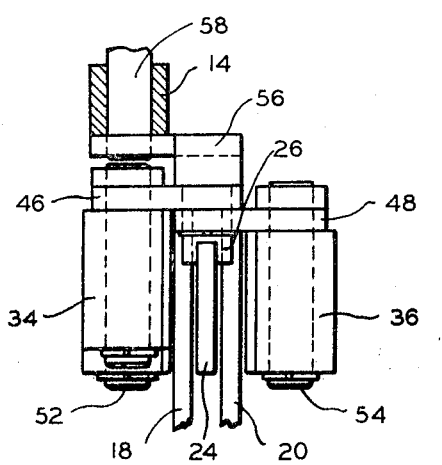
FIG. 4 is a partial sectional view of the mechanism shown in FIG. 1 along the line 4—4 thereof; and, FIG. 5 is a partial sectional view of the mechanism shown in FIG. 1 along the line 5—5 thereof.

Referring to FIGS. 1 and 3 of the drawing, a brake mechanism embodying this invention is indicated generally by the numeral 10. By way of background, brake mechanism 10 is operatively associated with a shaft or axle 12 which is rotatably supported relative to a stationary frame 14 by means of the bearings 16, and a pair of disc 18 and 20 are connected for conjoint rotation with shaft 12 through the splines indicated at 22. Brake mechanism 10 provides means for selectively retarding or braking the rotation of shaft 12 as hereinafter explained and may include an elongated plate 24 interleaved between discs 18 and 20 (FIG. 3). Plate 24 is fixedly connected to frame 14 at one end thereof by means of the slotted pin 26 (FIGS. 1 and 4) and at the other end thereof by means of the slotted pin 28 (FIG. 5), pins 26 and 28 being dowled to frame 14 as indicated at 30 and 32 respectively. A pair of disc engaging pressure members 34 and 36 (FIG. 2) are disposed outwardly on either side of discs 18 and 20 and these pressure members are adapted to move toward one another into frictional clutching engagement with discs 18 and 20 when it is desired to brake the rotation of shaft 12.

Figure 5:
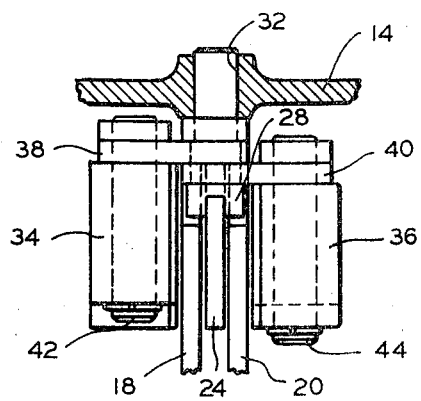

Referring now to FIGS. 2 and 5, a pair of allochirally related links 38 and 40 respectively connect one of the ends of pressure members 34 and 36 with frame 14, both of these links being pivotally supported from frame 14 upon the pin 28 with link 38 being pivotally connected to pressure member 34 by means of a pin 42 and link 40 being pivotally connected to pressure member 36 by means of a pin 44. A second pair of allochirally related links 46 and 48 (FIGS. 2 and 4) respectively connect the other ends of pressure members 34 and 36 with an actuating means which, in this embodiment, includes an actuating lever 50. Link 46 is pivotally connected to pressure member 34 by means of a pin 52 and link 48 is pivotally connected to pressure member 36 by means of a pin 54 and both of these links are pivotally connected to lever 50 for pivotal movement about a pin 56 fixedly extending from the actuating lever. Actuating lever 50 is pivotal about a fulcrum pin 58 supported from frame 14 (FIGS. 2 and 4) in such a manner that pin 56 may be moved right or left as viewed in FIG. 2 by moving lever handle 70 left or right in the directions indicated by the arrows numbered 60 and 62 respectively. Finally, a tension spring 64 (FIGS. 1 and 2) is connected between frame 14 and pin 56 and this spring provides means for biasing the actuating means toward the disengaged position shown in FIG. 2.

With particular reference now to FIG. 2, it will be observed that the distance between pins 28 and 56 is greater than either the distance between pins 42 and 52 or the distance between pins 44 and 54, and it will be understood that by increasing such distance between pins 28 and 56 the pressure members 34 and 36 will be required by the pivotal action of the connecting links to move toward one another and into clutching engagement with discs 18 and 20. Therefore, in operation, lever handle 70 may be moved in the direction indicated by arrow 60 to decrease the distance between pins 56 and 28 and thereby disengage the brake by moving pressure members 34 and 36 away from discs 18 and 20. When it is desired to engage the brake to retard the rotagion of shaft 12 actuating handle 70 is moved in the direction indicated by arrows 62 to increase the distance between pins 56 and 28 and thereby engage the brake by moving pressure members 34 and 36 toward one another and into frictional engagement with discs 18 and 20. Assuming now that shaft 12 is rotating in a counterclockwise direction as viewed in FIG. 1, an important feature of a brake mechanism embodying my invention should be noted. During brake engagement as pressure members 34 and 36 move toward one another their respective brake linings 66 and 68 move into frictional engagement with discs 18 and 20 so that a tangential retarding or braking force is exerted upon the rotating discs. This tangential force, in its equal to opposite form is reactively exerted upon pressure members 34 and 36 to urge these members to move farther toward the left as viewed in FIG. 2 and as these pressure members move in such a direction links 38 and 40 require that this movement be accompanied by a component of movement toward the rotating discs and therefore into greater frictional engagement with the discs.

It will now be understood that brake mechanism 10 is self-energizing in the sense that once pressure members 34 and 36 are moved into engagement with discs 18 and 20 through the action of actuating lever 50 a component of the braking force is utilized to aid in the engagement of the brake and therefore only a small "service" or control force must be exerted upon actuating lever handle 70 to obtain full braking effort.

While only a single preferred emboidment of my invention has been described and disclosed in deail herein, it will be understood that various modifications and changes can be made to this embodiment without departing from the spirit and scope of my invention. Consequently, the limits of my invention should only be determined from the following claims.

I claim:

1. A self-energizing disc brake mechansim comprising first and second parallel but axially spaced discs rotatable relative to a stationary frame, a central brake plate disposed between said discs and eccentrically relative thereto and being mechanically connected to said frame, first and seconm pressure members disposed adjacent respective surfaces of said first and second discs and substantially parallel to said brake plate so as to comprise, in combination with said brake plate, a mechanism for clutching said first and second discs to impose a retarding force thereon, first and second spaced pivot means slidably disposed on said brake plate, first and second rigid links pivotally connected between said first pivot means and first ends of the first and second pressure members, third and fourth rigid links connected between the second pivot means and a second end of the first and second pressure members, the distance between said first and second pivot means being greater than the distance between the pivotal ends of the links connected to either of the first and second pressure members whereby increasing the distance between the first and second pivot means tends to displace said pressure members toward one another and decreasing the distance between said first and second pivot means tends to displace said first and second pressure members away from one another, and actuating means for increasing and decreasing the distance between said first and second pivot means, the eccentric position of said first and second pressure members relative to the axis of rotation of said discs being operative to cause said first and second pressure members, when engaging said discs, to be displaced by way of said links along an axis of displacement which is substantially tangent to the direction of rotation of said discs thereby to increase the distance between said first and second pivot means and to increase the pressure exerted by said pressure means on said discs.

2. A brake mechanism for use with a disc rotatable relative to a stationary frame wherein the mechanism comprises a pressure member positionable eccentrically adjacent the disc and linkage means connecting said pressure member to the frame, said pressure member having an axis of displacement relative to the frame substantially tangent to the direction of rotation of the disc and said linkage means providing means for requiring said pressure member to move toward the disc when said pressure member is moved in the direction of said axis whereby the reactive force exerted on the pressure member upon frictional engagement with the disc tends to continue to displace said member along said axis, said linkage means including first and second links, the first link being pivotally connected at one end thereof to the frame and at the other end thereof to a first end of said pressure member, the seocnd link being pivotally connected at one end thereof to aid frame at a point spaced from the connection to said frame of said first link and movable relative to said frame, the other end of said second link being connected to said pressure member adjacent the second end thereof, actuating means for displacing said pressure member in the direction of displacement along said axis, the distance between the ends of the first and second links which are connected to the frame being greater than the distance between the ends of the first and second links that are connected to said pressure member, and biasing means connected to said linkage for urging said pressure member toward a position of disengagement from said disc.

3. A brake mechanism as defined in claim 2 including a second pressure member disposed parallel to the first pressure member and on the opposite side of said disc, third and fourth links connecting said second pressure member to said frame in reversely symmetrical relationship to the first and second links whereby the ends of said first and third links and said second and fourth links are commonly pivotally connected such that operation of second actuating means causes said pressure means to be displaced toward one another to clutch said disc.

* * * * *

UNITED STATES PATENT OFFICE
CERTIFICATE OF CORRECTION

Patent No. 3,749,206            Dated  31 July 1973

Inventor(s) Donald Spencer Dence

It is certified that error appears in the above-identified patent and that said Letters Patent are hereby corrected as shown below:

Column 1, line 4, delete "pretains" and insert -- pertains --.
Column 1, line 5, delete "mechanism" and insert -- mechanisms --.
Column 1, line 13, delete "necessry" and insert -- necessary --.
Column 1, line 17, delete "barke" and insert -- brake --.
Column 1, line 36, delete "Deskription" and insert -- Description --.
Column 1, line 56, delete "disc" and insert -- discs --.
Column 2, line 46, delete "rotagion" and insert -- rotation --.
Column 3, line 9, delete "emboidment" and insert -- embodiment --.
Column 3, line 22, delete "seconm" and insert -- second --.
Column 4, line 22, delete "seocnd" and insert -- second --.
Column 4, line 23, delete "aid" and insert -- said --.
Column 4, line 45, delete "second" and insert -- said --.

Signed and sealed this 19th day of February 1974.

(SEAL)
Attest:

EDWARD M. FLETCHER, JR.              C. MARSHALL DANN
Attesting Officer                    Commissioner of Patents